N. MACNEALE.
Safe-Door.
No. 165,599.
Patented July 13, 1875.
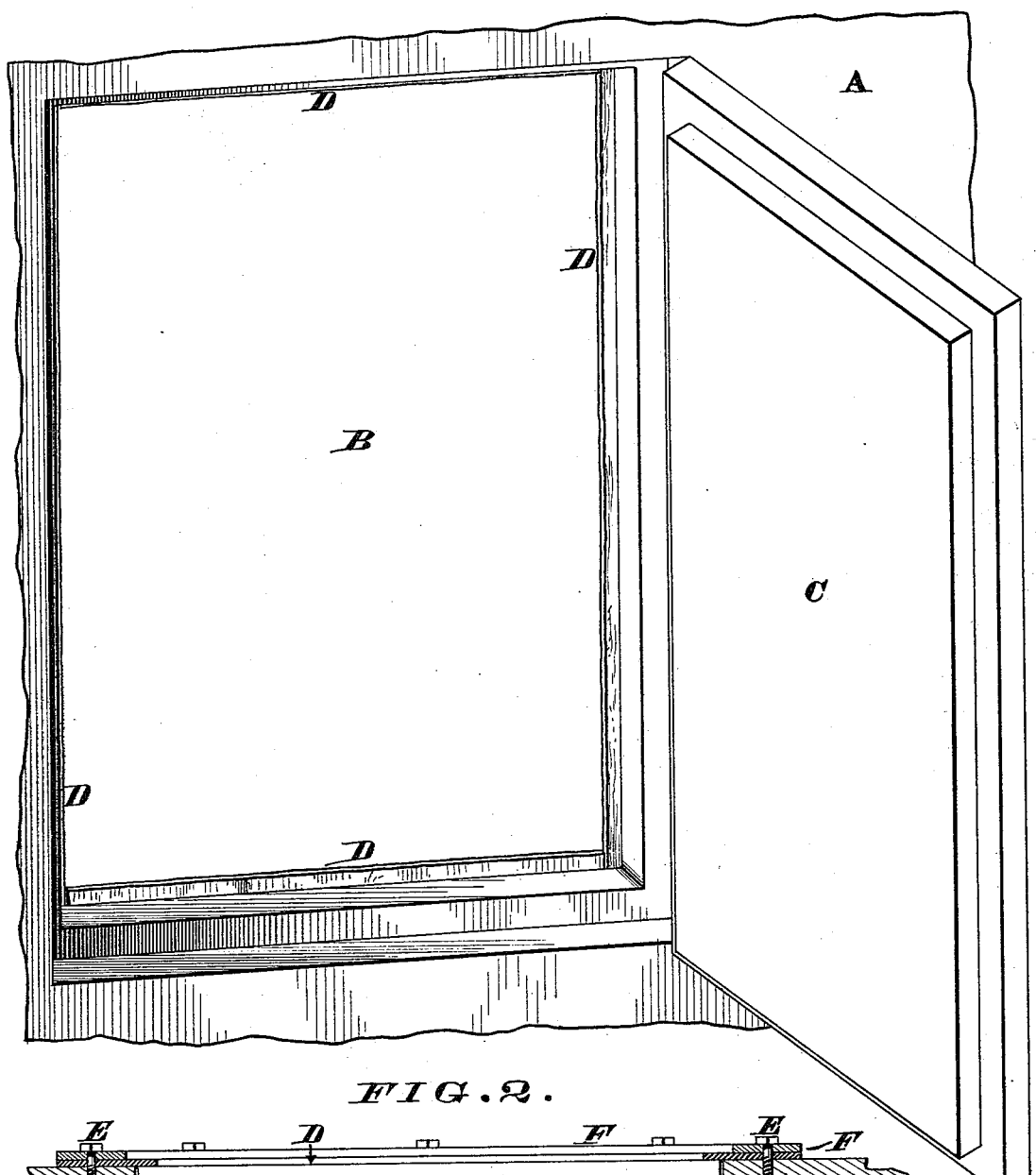
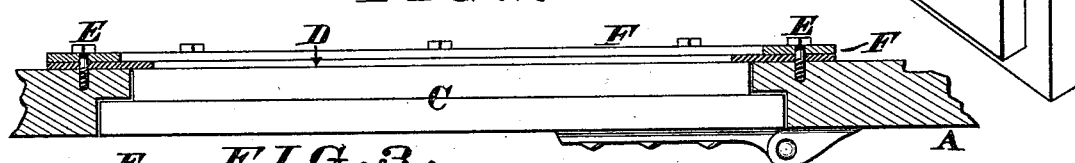
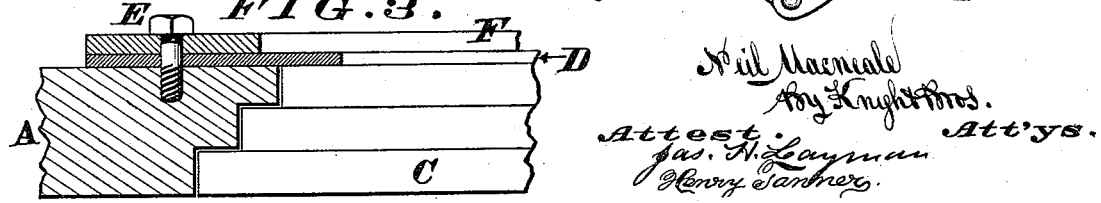

UNITED STATES PATENT OFFICE.

NEIL MACNEALE, OF CINCINNATI, OHIO.

IMPROVEMENT IN SAFE-DOORS.

Specification forming part of Letters Patent No. 165,599, dated July 13, 1876; application filed May 25, 1875.

*To all whom it may concern:*

Be it known that I, NEIL MACNEALE, of Cincinnati, Hamilton county, Ohio, have invented a new and useful Improvement in Safe-Doors, of which the following is a specification:

My invention is more particularly designed for burglar-proof safes; and consists of the provision of a flexible flap or valve, which entirely surrounds the inner margin of the doorway, so that without wholly preventing the circulation of air between the outer and inner portions of the safe, or the escape of moisture from the latter, yet will act as a valve or trap to effectually prevent the exhaustion of the air from the inside, and thereby create an ingoing current by which gunpowder or other explosive material can be introduced.

In the accompanying drawing, Figure 1 is a perspective view of a portion of a safe including a doorway furnished with my improvement. Fig. 2 is a horizontal section through the same. Fig. 3 is a section, to a larger scale, of a safe-joint or door-jamb with my valve or flap.

A may represent part of a burglar-proof safe, B being doorway, and C the hinged door of same. Attached to the inner wall of the safe, so as to surround and project somewhat beyond the doorway, is a flap, D, composed of one or more strips of india-rubber or leather, or other tough, flexible, and impervious material. Said flap may be secured by means of screw-bolts E and annular washer F, or by other suitable means.

I am aware that rubber packing has been used in the form of gaskets in the offsets or rabbets of safe-doors to prevent the introduction of explosives; but such packing has not, like my flap, been effective to prevent the exhaustion of air by other apertures than the door, but, on the contrary, has facilitated such action. My flap, on the contrary, by yielding to the pressure of the atmosphere at every part, continually restores any disturbance of the equilibrium by such exhaust through an aperture made in any other part of the safe, and on the other hand entirely precludes any exhaust at any part of the joint around the door. Again, such gaskets have been found after long use to be inefficient from another cause—the hardening and compacting of the rubber, so as to leave the joint open.

I do not claim as new the application of india-rubber packing to safes other than as a valve or flap, arranged and adapted to operate in the manner indicated.

I claim as new and of my invention—

The flap D, attached to the inner wall of a safe around the door-opening, so as to entirely cover without wholly closing the joint or crevice between the door and opening, in manner substantially as set forth.

In testimony of which invention I hereunto set my hand.

N. MACNEALE.

Attest:

GEO. H. KNIGHT,
JAMES H. LAYMAN.